(12) United States Patent
Hluchyj

(10) Patent No.: US 6,381,238 B1
(45) Date of Patent: Apr. 30, 2002

(54) APPARATUS AND METHOD FOR A TELEPHONY GATEWAY

(75) Inventor: Michael G. Hluchyj, Wellesley, MA (US)

(73) Assignee: Sonus Networks, Westford, MA (US)

( * ) Notice: Subject to any disclaimer, the term of this patent is extended or adjusted under 35 U.S.C. 154(b) by 0 days.

(21) Appl. No.: 09/127,223

(22) Filed: Jul. 31, 1998

(51) Int. Cl.[7] .................................................. H04L 12/66
(52) U.S. Cl. .................................... 370/352; 370/466
(58) Field of Search ............................... 370/352, 353, 370/354, 355, 464, 465, 466, 467, 401, 402

(56) References Cited

U.S. PATENT DOCUMENTS

| | | | |
|---|---|---|---|
| 5,008,878 A | * | 4/1991 | Ahmadi et al. ............. 370/353 |
| 5,483,527 A | | 1/1996 | Doshi et al. ................ 370/60.1 |
| 5,663,955 A | * | 9/1997 | Iyengar ....................... 370/291 |
| 6,026,086 A | * | 2/2000 | Lancelot et al. ............ 370/353 |
| 6,069,890 A | * | 5/2000 | White et al. ................. 370/352 |
| 6,078,582 A | * | 6/2000 | Curry et al. ................. 370/356 |

FOREIGN PATENT DOCUMENTS

WO      WO 97/23078      6/1997

OTHER PUBLICATIONS

"A High Performance Switch Fabric for Integrated Circuit and Packet Switching" Ahmadi, et al., IBM Research Division, Zurich Research Laboratory, 8803 Rüschlikon, Switzerland, ©1998 IEEE, pp. 9–18.

* cited by examiner

*Primary Examiner*—Chau Nguyen
*Assistant Examiner*—Soon-Dong Hyun
(74) *Attorney, Agent, or Firm*—Bromberg & Sunstein LLP

(57) ABSTRACT

A system and method for connecting a circuit network with a packet network. In one embodiment, the system contains a packet switch fabric, a circuit network server, a packet network server and a signal processing server. The circuit network server can send and receive circuit-based signals with the circuit network and can also send and receive packet-based signals with the packet switch fabric. The circuit network server has a digital signal processor which provides packet adaptation. The packet network server can send and receive packet-based signals with the packet switch fabric and can send and receive packet-based signals with the packet network. The signal processing server can send and receive packet-based signals with the packet switch fabric and has a digital signal processor for performing signal processing on the packet-based signals. The packet switch fabric transfers packet-based signals among the packet network server, the signal processing server, and the circuit network server.

30 Claims, 6 Drawing Sheets

APPARATUS AND METHOD FOR A TELEPHONY GATEWAY

TECHNICAL FIELD

The present invention relates to network interfaces and, more specifically, to gateways connecting circuit networks and packet networks.

BACKGROUND ART

Currently, circuit switching technology forms the basis for the world-wide telecommunications network infrastructure and is used extensively in telephone systems, however the recent expansion of the Internet has fueled the use of packet-based technologies. Packet-based technologies can be used as an alternative or in combination with circuit switching technologies in these telecommunications networks and telephone systems. When packet-based and circuit-based communication technologies are used together, a bridge, known as a gateway, is necessary to transform and route signals between a circuit network and a packet network. Telephony gateways interconnecting to the circuit network may use standards-based time division multiplexed (TDM) trunks (T1, T3, E1, etc) and standards-based signaling mechanisms (e.g., Signaling System 7 or channel associated signaling). An example of a circuit network is the telephone system that provides subscribers with plain old telephone service (POTS). The gateway may interconnect to the packet network through standards-based packet interfaces such as Internet Protocol (IP), Frame Relay and Asynchronous Transfer Mode (ATM) over a variety of physical interfaces (e.g., 100BaseT, T3, OC3c, OC12c). An example of a packet network is the Internet.

FIG. 1 illustrates the architecture of a prior art telephony gateway 10. This gateway architecture uses a circuit switch fabric 12 such as a TDM bus or a Time-Slot-Interchange to provide the internal switching between the circuit network 14 and the packet network 16. Circuit-to-circuit calls, as indicated by line 15, are switched between circuit network servers 18 using the circuit switch fabric 12. Circuit-to-packet calls, as indicated by line 17, are switched between circuit network servers 18 and packet network servers 19 using this same circuit switch fabric 12. The conversion of the circuit data to packet data, which is known as packet adaptation, is performed in the packet network servers 19, which incorporate digital signal processors (not shown) for echo cancellation and transcoding. The circuit switch fabric 12, however, limits the overall flexibility of the gateway to move packets among server cards.

FIG. 2 illustrates the architecture of another prior art telephony gateway 20. For greater flexibility, this gateway architecture separates the signal processing functions from the packet network servers 22 and places these functions on signal processing servers 21. In addition, a packet switch fabric 23 allows connectivity from any signal processing server 21 to any packet network server 22. It is well known that a packet switch fabric 23 can be implemented with a variety of technologies, such as an arbitrated packet bus or a centralized switching module. As in the gateway architecture of FIG. 1, circuit-to-circuit calls are switched via the circuit switch fabric 12 as indicated by line 24. Circuit-to-packet calls, as indicated by line 25, are first switched by the circuit switch fabric 26 to a signal processing server 21 that contains an available digital signal processor (DSP) for performing signal processing. The signal processing server 21 uses the packet switch fabric 23 to move the processed information to a packet network server 22 and the associated packet network interface selected during call establishment. The separation of the signal processing function on separate servers allows a call-by-call selection of different DSP-based functions. For example, different calls can use different compression algorithms, with differing processing complexity, residing on different signal processing servers 22. While the flexibility of the packet switch fabric 23 represents an improvement over the architecture of FIG. 1, the architecture of FIG. 2 carries the cost and complexity burden of two separate and independent switch fabrics: one circuit and one packet.

SUMMARY OF THE INVENTION

The invention provides, in a preferred embodiment, a system for connecting a circuit network with a packet network. In one embodiment, the system contains a packet switch fabric, a circuit network server, a packet network server and a signal processing server. The circuit network server can send and receive circuit-based signals with the circuit network and can also send and receive packet-based signals with the packet switch fabric. The circuit network server has a digital signal processor which provides packet adaptation. The packet network server can send and receive packet-based signals with the packet switch fabric and can send and receive packet-based signals with the packet network. The signal processing server can send and receive packet-based signals with the packet switch fabric and has a digital signal processor for performing signal processing on the packet-based signals. The packet switch fabric transfers packet-based signals among the packet network server, the signal processing server, and the circuit network server.

In further embodiments, the digital signal processor of the circuit network server performs signal processing and it may also perform echo cancellation. In an alternative embodiment, the circuit network server may contain additional digital signal processors, wherein packet adaptation is performed on a circuit-based signal by a digital signal processor forming a packet-based signal prior to signal processing being performed on the packet-based signal. In another embodiment, the digital signal processor of the signal processing server performs transcoding and additionally, may perform echo cancellation.

In alternative embodiments, the packet switch fabric may be a switching module, a packet bus, or a cell bus.

In yet another embodiment, the system may further include a management server which is coupled to the packet switch fabric and provides management of gateway resources.

In a related embodiment in accordance with the invention, the circuit network server contains a line interface unit and a framer for interfacing with the circuit network and a packet bus interface for interfacing with the packet bus and distributing a packet-based signal to the packet bus. The packet bus interface may contain a multiplexer coupled to the digital signal processor for sending and receiving packets. In yet another related embodiment of the invention, the signal processing server contains a packet bus interface and a digital signal processor. The digital signal processor may be configured to transcode packet-based signals and the packet bus interface may contain a multiplexer. Other objects and advantages of the present invention will become apparent during the following description of the presently preferred embodiments of the present invention taken in conjunction with the drawings.

DETAILED DESCRIPTION OF SPECIFIC EMBODIMENTS

The word "packet" as used herein defines a block of data with a header. The term packet includes cells. A packet header typically includes information, such as, the source and destination addresses or a connection identifier. The header is used to direct the packet through the packet network. The term "packet switch fabric" as used herein refers to any device which contains the means to transfer packets between two or more devices. A packet switch fabric may be, but is not limited to, a packet bus, a switching module, a cell bus, a crossbar switch, a space division switch or a signal router. The term "multiplexer" shall refer to any device, which may perform multiplexing, demultiplexing, or both multiplexing and demultiplexing functions. The term "transcoding" refers to the process of transforming a signal from one state of coding to another. For example, an uncompressed signal may be transcoded via a GSM audio compression technique forming a GSM encoded signal. ADPCM, LD-CELP, CELP, LPC10, CELP G.711, G.722, G.723.1, G.726, G.728, and G.729 are some examples of coding states that a signal may be transcoded between. The term "circuit-based signal" refers to a data stream in a time division multiplexed path containing digital information. The term "packet based signal" refers to a data stream containing packets, wherein the packets contain digital information. The term, "packet adaptation" refers to the process of segmenting a circuit-based digital signal composed of samples and creating a packet from the segment by adding a header. Packet adaptation also refers to the process of removing the header information from a packet and reassembling the packets to recreate the circuit-based digital signal. Packet adaptation may further include the process of time stamping. Hereinafter both special purpose digital signal processors and general purpose digital signal processors shall be referred to as digital signal processors (DSPs). The term "port" shall refer to any input or output. A port may include multiple inputs and multiple outputs. The term "gateway signal processing" refers to signal processing that is performed on a gateway such as transcoding, echo cancellation, silence detection, comfort noise generation, tone detection and generation, and FAX and modem relay.

Figure 1:
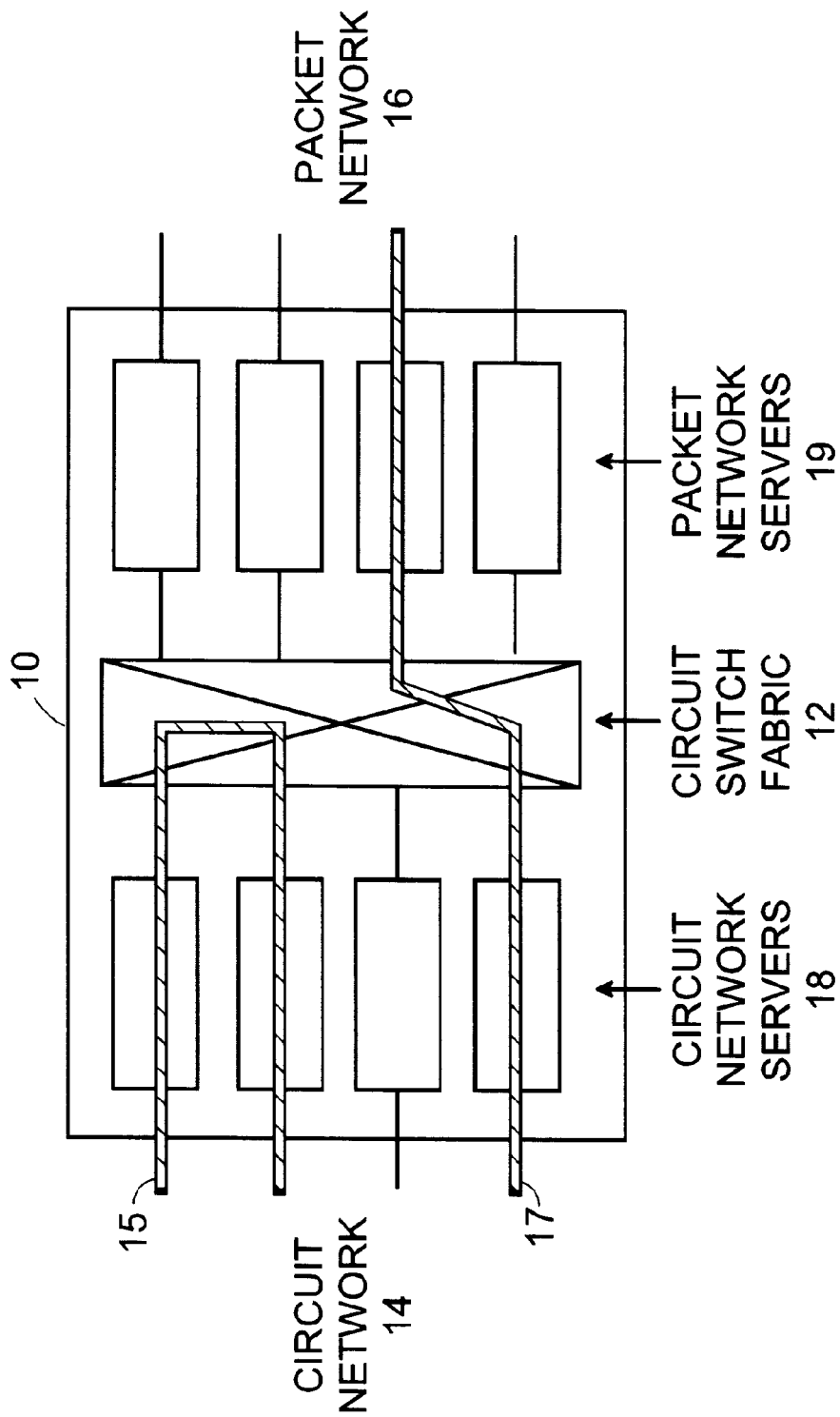
FIG. 1 is a block diagram of the architecture of a prior art telephony gateway.
Figure 2:
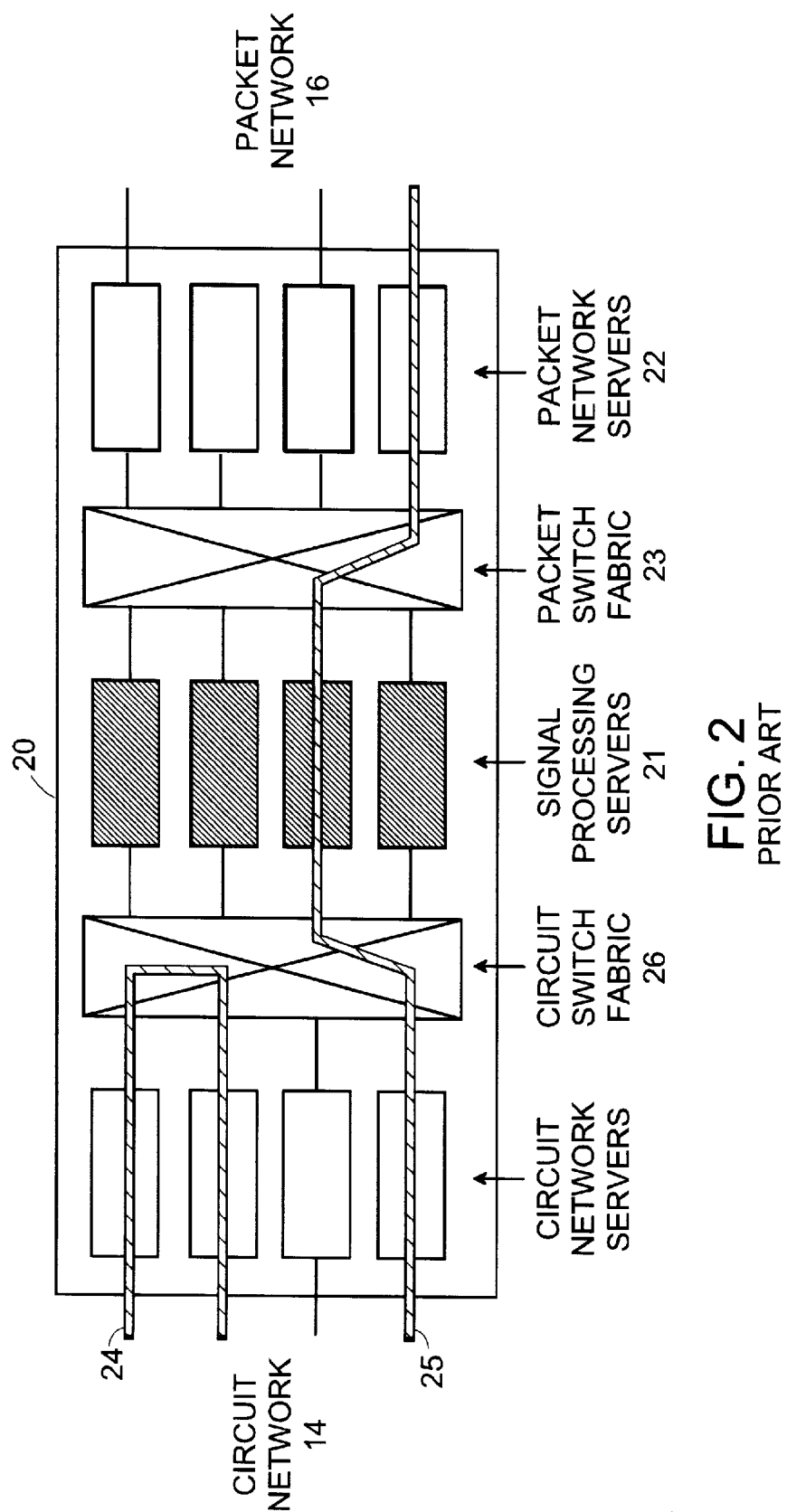
FIG. 2 is a block diagram of the architecture of another prior art telephony gateway.
Figure 3:
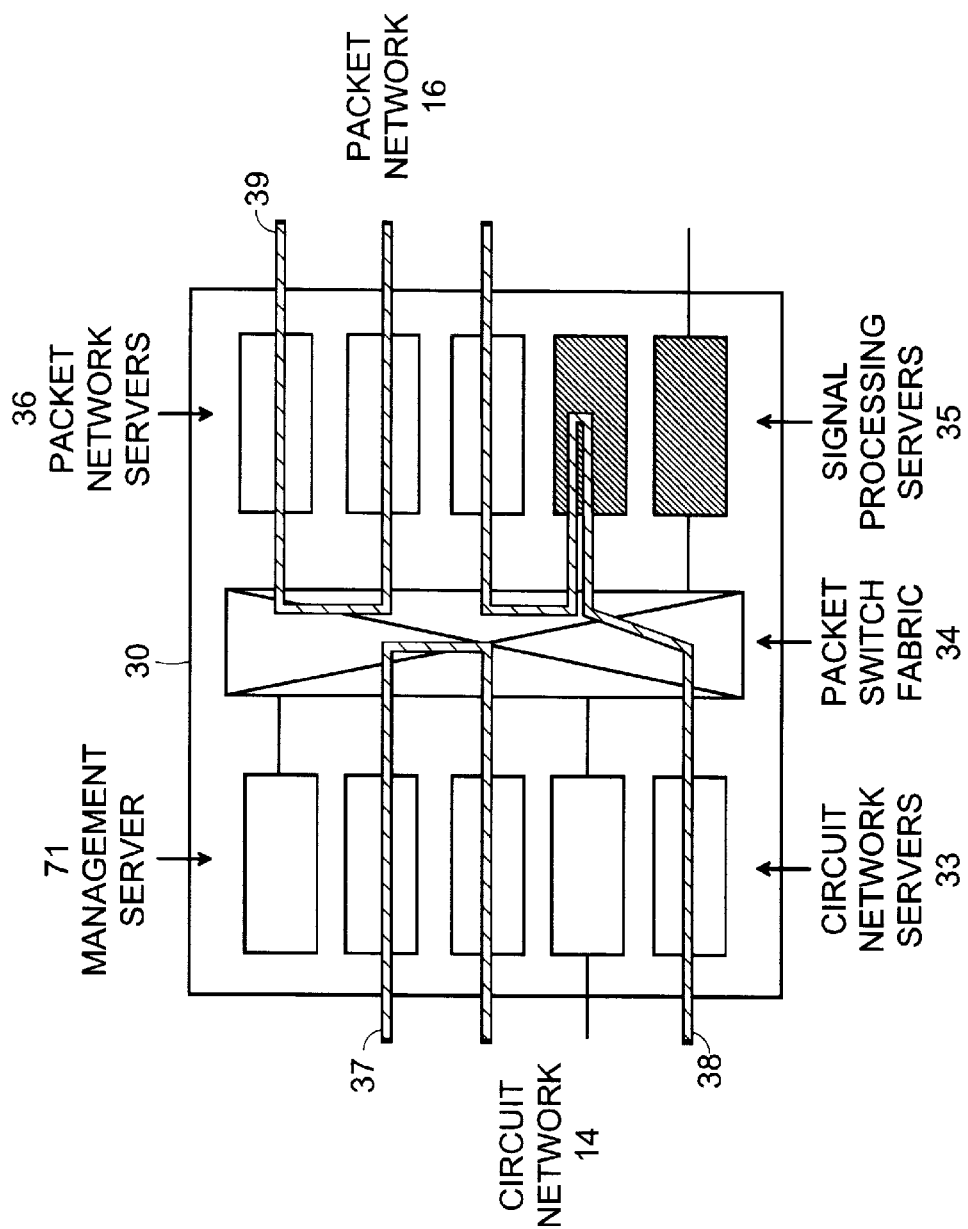
FIG. 3 is a block diagram of a system for connecting a circuit network with a packet network in an embodiment in accordance with the invention.

FIG. 3 shows a gateway 30 for connecting a circuit network with a packet network using a packet switch fabric in accordance with one embodiment of the invention. This system may perform circuit-to-circuit connections 37, circuit-to-packet connections and packet-to-circuit connections 38, and packet-to-packet connections 39.

In one embodiment of the invention, the system of FIG. 3 is composed of multiple circuit network servers 33 and multiple packet network servers 36 and at least one signal processing server 35 all coupled to a packet switch fabric 34. Each server may be designed as a combination of integrated circuits and other components and placed on an individual integrated circuit card or module for insertion into a module receptor board. The cards may be combined together to form different modules, such as, combining the packet network server 36 and the signal processing server 35 cards into a single module. The packet switch fabric 34 may also be implemented as a module when the packet switch fabric takes the form of a signal switcher, a router, or a packet bus with interface circuits.

In an embodiment, the system includes a circuit network server 33 for receiving circuit-based signals from the circuit network 14. In accordance with an embodiment of the invention, each circuit network server 33 performs packet adaptation on a circuit-based signal to form a packet-based signal. Additional signal processing functions may also be included in the circuit network server such as echo cancellation. In alternative embodiments, multiple DSPs may be located on the circuit network server 33 where each DSP may perform both packet adaptation and signal processing, just signal processing or just packet adaptation.

When the circuit network server 33 converts the arriving circuit-based signal such as pulse code modulated (PCM) samples into packets, it may be necessary or desirable to perform echo cancellation on the PCM samples. In the circuit network server 33, the added delay related to accumulating the PCM samples to form packets could result in degraded voice quality experienced by the subscribers due to noticeable echoes. This and all other signal processing functions can be provided by specialized devices such as customized integrated circuits or general purpose digital signal processors in communication with processor control software in the gateway. Alternatively, echo cancellation may be performed on one of the signal processing servers 35. In one form of implementation, once signal processing has been performed on the samples of the circuit-based signal, the samples are grouped into packets and header information is attached:to the packet for identifying at least the packet size, its source, its destination, and its numerical position within the signal stream.

The packet-based signal may be transferred from the circuit network server 33 to either a signal processing server 35 or directly to a packet network server 36. The signal processing server 35 provides additional signal processing for a connection, such as transcoding, digital filtering, or echo cancellation. This process may take place on one or more DSPs within the signal processing server 35. In accordance with one embodiment of the invention, each DSP on the signal processing server 35 may be so equipped as to perform a separate type of transcoding. For example, one DSP might transcode G.711 to G.729 and another DSP might transcode G.711 to G.723.1, wherein the signal would be routed to the appropriate DSP for a given connection. The signal processing server 35 is designed in such a way as to permit the signal to be routed between DSPs. It should be apparent to those skilled in the art that signal processing such as transcoding may be performed on a packet-based signal wherein a header of a packet in the packet-based signal is stripped, signal processing is performed on the data of the packet and a header is added to the signal-processed data forming a new packet. For some signal processing applications involving packets, it may be necessary to accumulate multiple packets before signal processing can be performed on data within the packets. In the course of the signal processing on the signal processing server 35, information within the stream of packets may be reconstituted.

For example, in the case of transcoding, data from two or more packets may be compressed and placed into a single packet. After signal processing has been performed on the packet-based signal in the signal processing server 35, the packet-based signal may be transferred to the packet network server 36. The packet network server 36 performs all the functions that are necessary for transferring the packet-based signal to the packet network 16.

Gateway functions such as the routing of the circuit-based and packet-based signals, assigning the appropriate DSP for transcoding and routing of the signals through the gateway may be distributed throughout the gateway on each of the servers.

An alternative embodiment in accordance with the invention includes a management server 71 coupled to the packet switch fabric 34. The management server 71 has overall responsibility for the management of gateway resources including routing of the signals and assignment of the appropriate DSPs. The management server 71 coordinates the overall operation of the telephony gateway 30, including the booting of the gateway on power-up, configuration of the gateway resources, recovery from component failures, and reporting of events, alarm and billing information to an external network management system (not shown).

The packet switch fabric 34 transfers packet-based signals among packet network servers 36, signal processing servers 35, and circuit network servers 33. In an embodiment of the invention, the packet switch fabric 34 may be a packet bus. In another embodiment, the system may operate on ATM cells and the packet switch fabric 34 would be a cell bus. Packet network servers 36 and signal processing servers 35 would be configured to handle cells in such an embodiment.

Figure 4:
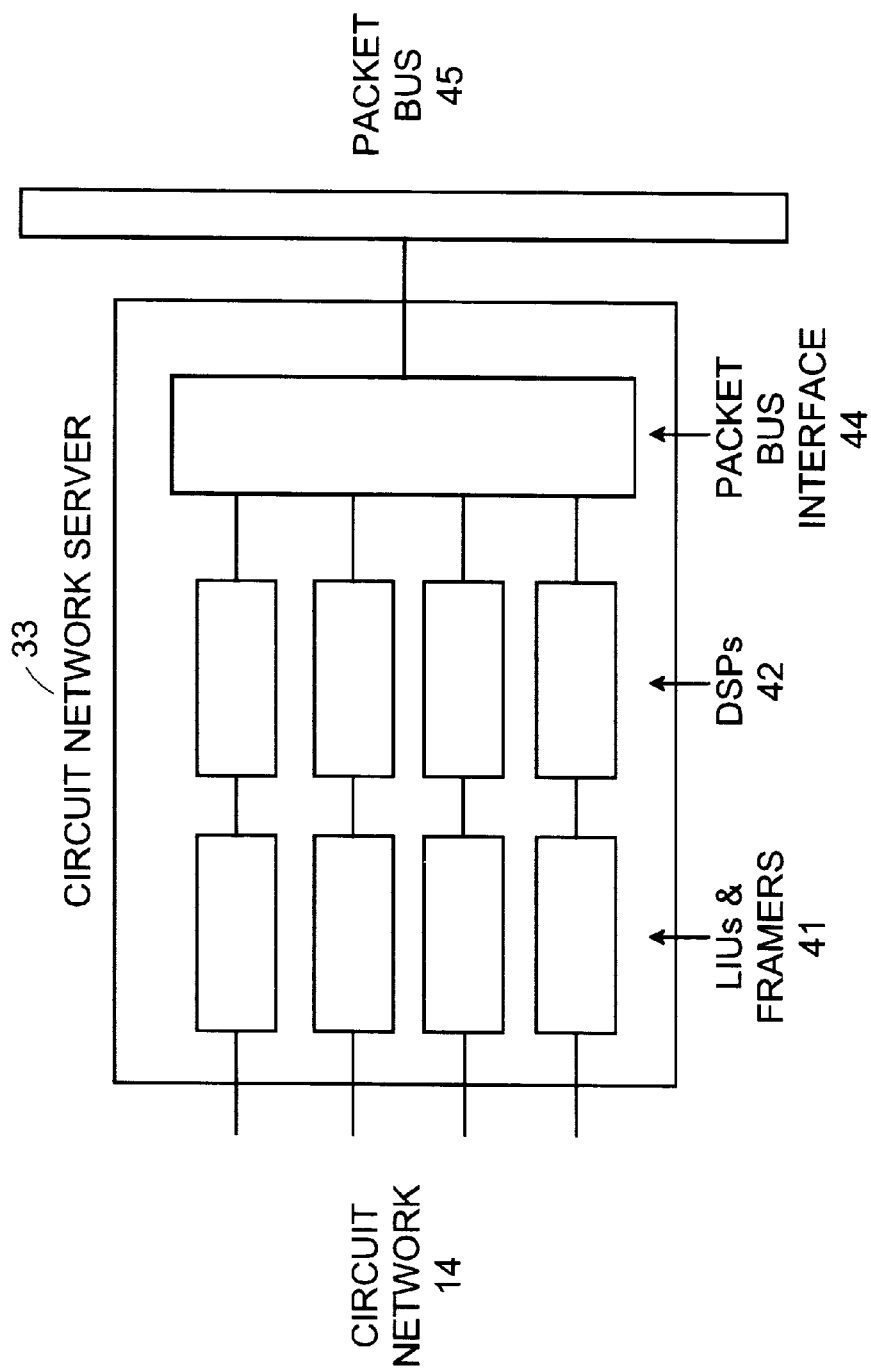
FIG. 4 is a block diagram of the components of a circuit network server in accordance with an embodiment of the invention.

In one embodiment in which the packet switch fabric 34 is implemented as a packet bus, each circuit network server 33 (see FIG. 4) contains line interface units (LIUs) and framers 41 required to interface to the circuit network 14. The circuit network server 33 may have multiple ports for connecting to the circuit network 14 and as a result multiple LIUs and framers 41 and DSPs 42. In an embodiment of the invention, the LIU converts the incoming voltage level to digital ones and zeros while the framer locates each frame of a circuit-based signal. For example, if the circuit network is a T1 connection, the framer locates each 193-bit frame from the T1 line and extracts the 24 channels that make up the T1 transmission. The output of the framer may couple to a TDM-style interface on a DSP 42. The DSP may be, for example, a DSP from Texas Instruments, model number TMS320C549. The DSP performs at least packet adaptation. Packet adaptation includes grouping together samples of a circuit-based signal, reordering packet-based signals and adding or removing a header such as an INTERNET protocol (IP), user datagram protocol (UDP), or real-time protocol (RTP) header. In one embodiment, the RTP header is mapped to the packet in the DSP and then UDP and IP headers are added on by the packet network server 36. The packets exiting the DSPs 42 are multiplexed in the packet bus interface 44 by a packet multiplexer, and sent across the packet bus 45 to either a signal processing server 35 for transcoding, directly to a packet network server 36 when transcoding is not necessary, or to another circuit network server 33. The packet bus interface 44 may be implemented with a chip from TranSwitch, model number TXC-05802 in combination with a multiplexer that may be implemented with a Maker MXT3010 programmable cell processing engine. The packet bus interface 44 contains all the necessary functions for implementing inlet queuing of the packets, cell address translation, cell routing, and outlet cell queuing. The packet bus provides the packet switch fabric 34 of FIG. 3 in this embodiment.

Figure 5:
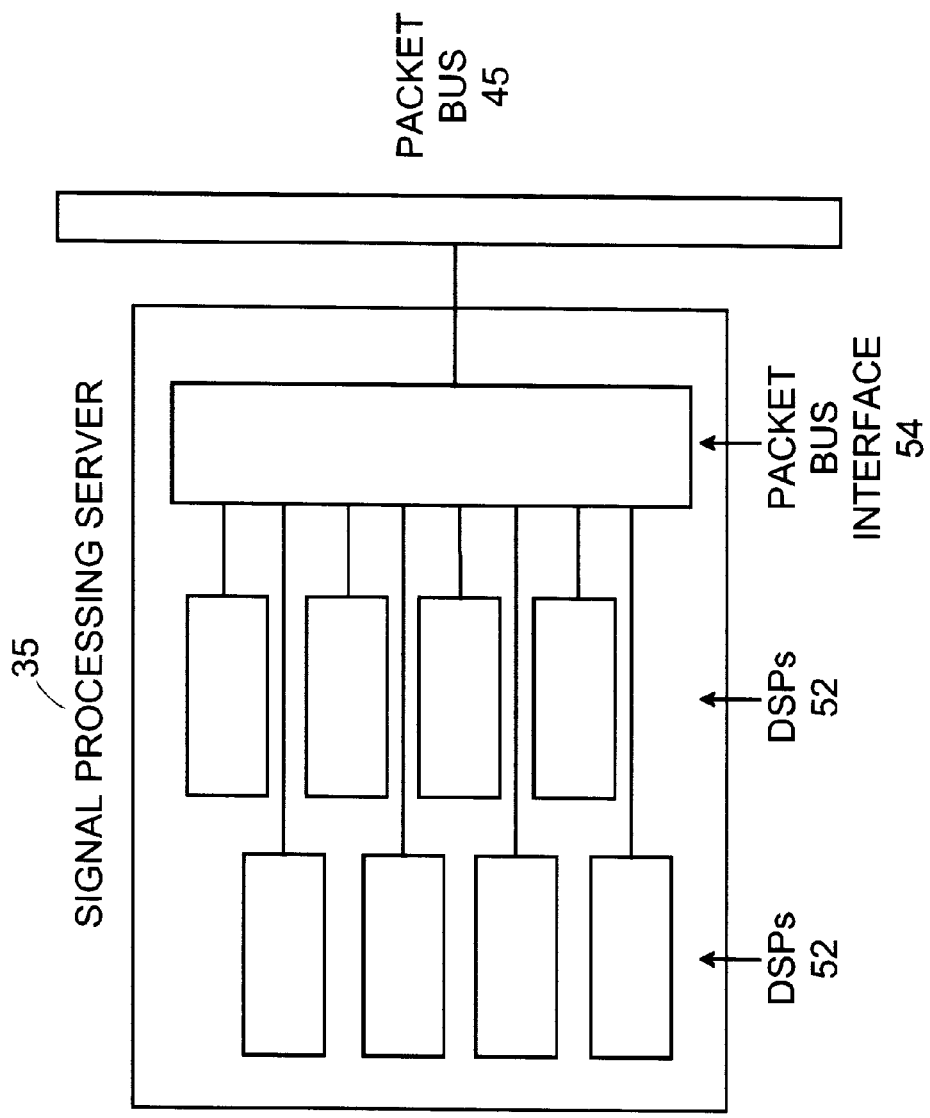
FIG. 5 is a block diagram of the components of the signal processing server in accordance with an embodiment of the invention.

Access to the signal processing server 35 (see FIG. 5) is via the packet bus 45 in one embodiment of the invention. The signal processing server 35 contains DSPs 52, which have packet interfaces (not shown). The DSPs 52 receive packets from a packet bus interface 54 which contains a multiplexer for performing packet demultiplexing on the incoming packets. After the DSPs process the data, the DSPs send packets containing processed data to the packet bus interface 54 for packet multiplexing. The packet bus interface 54 may be implemented with a chip from TranSwitch, model number TXC-05802, in combination with a multiplexer that may be implemented with a Maker MXT3010 programmable cell processing engine. Packets from the packet-based signals may be transferred to any of the DSPs 52 via the packet bus interface 54. The packet bus interface 54 takes the multiplexed packet-based signal and directs the signal onto the packet bus 45.

Figure 6:
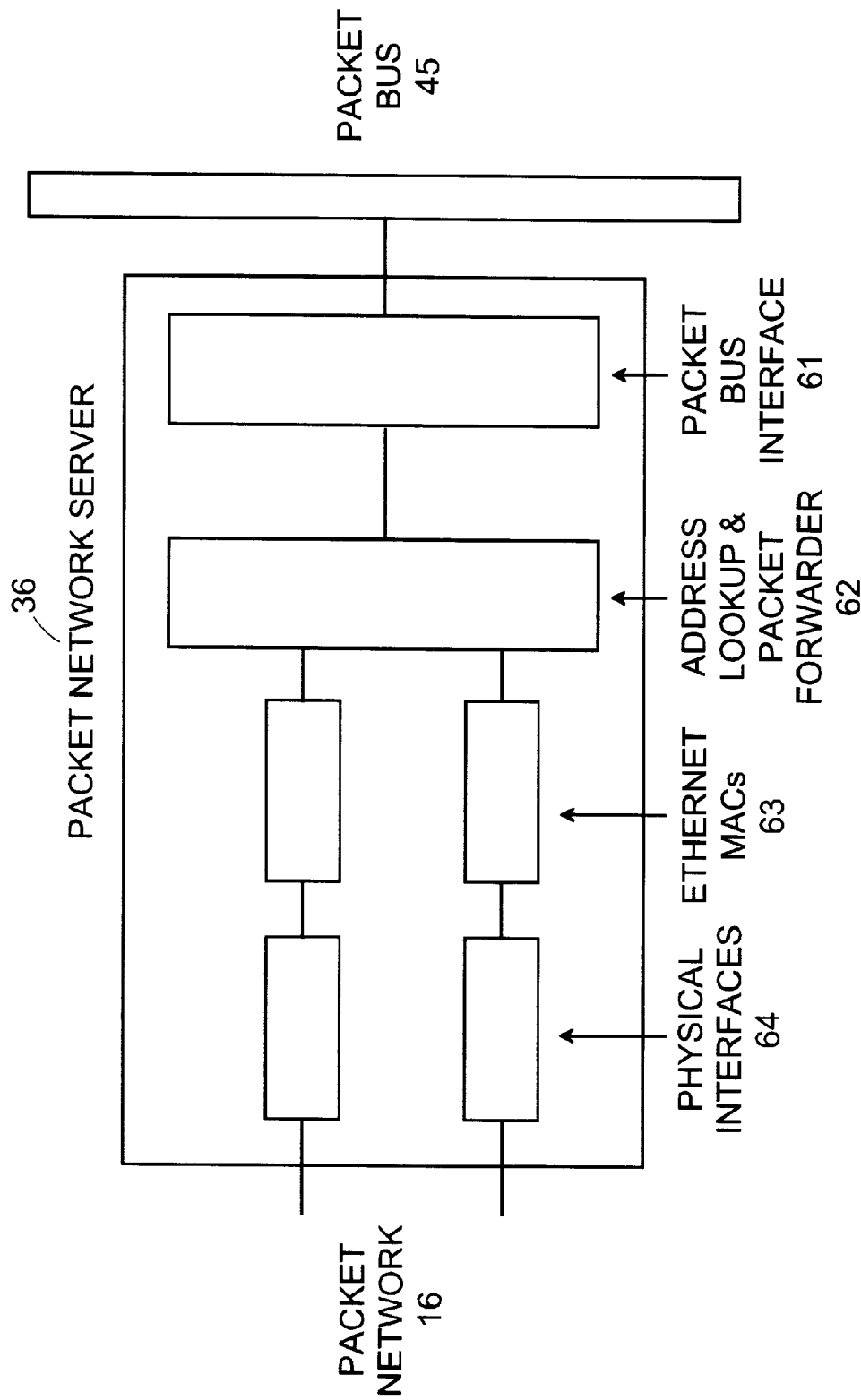
FIG. 6 is a block diagram of the components of the packet network server in accordance with an embodiment of the invention.

In an embodiment of the invention, each packet network server 36 (see FIG. 6) interfaces to the packet bus 45 via a packet bus interface 61 for sending and receiving packets to the circuit network servers 33 and signal processing servers 35, and interfaces to the packet network 16 by standard packet network interfaces such as Ethernet. The packet network server 36 performs the packet switching functions of address lookup and packet forwarding 62. The address lookup and packet forwarder 62 may analyze the packet header to identify the necessary resources for the connection and may strip the IP and UDP header and insert an internal gateway connection identifier. An Ethernet Medium Access Control (MAC) device 63 controls access to the packet network interface. A physical interface 64 or port provides the connection between a line in the packet network and the gateway. The physical interface 64 may be, but is not limited to, a coaxial interface, or a twisted pair interface for 10-base-T or 100-base-T connections.

Referring to FIG. 3, a circuit-based signal may be traced from the circuit network to the packet network as follows. A circuit-based signal is received from the circuit network 14 into one of the circuit network servers 33. According to one embodiment of the invention, echo cancellation is performed in the circuit network server 33 on the circuit-based signal. This is followed by packet adaptation in the circuit network server 33 to form a packet-based signal. The packet-based signal is transferred to the packet switch fabric 34 and routed to either one of the signal processing servers 35 if transcoding is necessary or if transcoding is not necessary to one of the packet network servers 36. If transcoding is necessary, the packet-based signal is transferred from the packet switch fabric 34 to a signal processing server 35 where transcoding occurs. Then the transcoded packet-based signal may be transferred directly to a packet network server 36 if the system is designed with such a routing connection or it is transferred back to the packet switch fabric 34 and then onto a packet network server 36. The packet network server 36 transfers the packet-based signal to the packet network 16.

It is also possible to have a packet-based signal in the packet network 16 transferred to the circuit network 14 using the same embodiment of the system as shown in FIG. 3. A packet-based signal is received from the packet network 16 into one of the packet network servers 36. The packet-based signal is transferred from the packet network server 36 to a packet switch fabric 34 or directly to a signal processing server 35 if the system is so configured. From the packet switch fabric 34, the packet-based signal may be transferred to a signal processing server 35 if the packet-based signal requires transcoding. If transcoding is not required, the signal is transferred to one of the circuit network servers 33. On the circuit network server 33 packet adaptation occurs transforming the packet-based signal into a circuit-based signal and then the circuit network server 33 performs echo cancellation. The circuit network server 33 then transfers the circuit-based signal to the circuit network 14.

In a preferred embodiment of the invention, the gateway contains multiple circuit network servers 33 and multiple packet network servers 36 with the packet switch fabric 34 coupling all the servers together so that a signal may be transferred between any two servers. Routing may take place on a circuit-based signal wherein the circuit-based signal is transferred from one circuit-based connection in the circuit network 14 to a second circuit-based connection in the circuit network 14 as shown by line 37. This is done in the following fashion. The circuit-based signal is transferred into a circuit network server 33 where packet adaptation is performed forming a packet-based signal. The packet-based signal is transferred to the packet switch fabric 34 and then to a second circuit network server 33. The second circuit network server 33 performs packet adaptation on the packet-based-signal forming a circuit-based signal. The circuit-based signal is then transferred to the circuit network 14 to the second circuit-based connection.

In a similar manner, a packet-based signal may be transferred from one address location in the packet network 16 to a destination address. A packet-based signal is transferred to the packet network server 36. The packet-based signal is then transferred onto the packet switch fabric 34. If transcoding is necessary, the packet-based signal is transferred to the signal processing server 35 where the packet-based signal is transcoded, and then sent to the packet switch fabric 34. The packet-based signal is transferred to a second packet network server 36 and from the second packet network server 36 into the packet network 16. The packet-based signal is finally directed to the destination address.

The ability to perform packet adaptation prior to signal processing provides a great deal of flexibility in designing a gateway since there is no need for a circuit switch fabric in the gateway. In one embodiment, the signal processing servers 35 are structured to perform all permutations of transcoding and are a shared resource among all of the circuit network servers, so that the total number of digital signal processors performing transcoding is reduced. Since the number of signal processors that are required is decreased, the available space on a standard sized gateway layout board is increased allowing for a greater number of circuit network and packet network servers and therefore a greater number of ports.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A system for connecting a circuit network with a packet network, the system comprising:

a packet switch fabric;

a circuit network server having a first port for sending and receiving circuit-based signals with the circuit network, the circuit network server having a digital signal processor for providing packet adaptation and a second port for sending and receiving packet-based signals having packets with the packet switch fabric;

a packet network server having a first port for sending and receiving packet-based signals with the packet switch fabric and a second port for sending and receiving packet-based signals with the packet network; and a signal processing server having a port for sending and receiving packet-based signals with the packet switch fabric, the signal processing server having a digital signal processor for performing signal processing on the packet-based signals;

wherein the packet switch fabric transfers packet-based signals among the packet network server, the signal processing server, and the circuit network server.

2. A system according to claim 1 wherein, the digital signal processor of the circuit network server further performs gateway signal processing.

3. A system according to claim 1 wherein, the signal processing performed on the digital signal processor of the signal processing server is gateway signal processing.

4. A system according to claim 3 wherein, the gateway signal processing of the digital signal processor of the signal processing server is transcoding.

5. A system according to claim 2 wherein, the gateway signal processing of the digital signal processor of the circuit network server is echo cancellation.

6. A system according to claim 3 wherein, the gateway signal processing of the digital signal processor of the signal processing server is echo cancellation.

7. A system according to claim 3 wherein, the packet switch fabric further comprises a switch for switching among the packet network server, the signal processing server, and the circuit network server.

8. A system according to claim 3 wherein, the packet switch fabric is a switching module.

9. A system according to claim 3 wherein, the packet switch fabric is a packet bus.

10. A system according to claim 3 wherein, the packet switch fabric is a cell bus.

11. A system according to claim 3 further comprising:

a management server coupled to the packet switch fabric providing management of gateway resources;

wherein the packet switch fabric also transfers packet-based signals to the management server.

12. A system according to claim 9 wherein, the circuit network server comprises:

a line interface unit and a framer for interfacing with the circuit network; and a packet bus interface for interfacing with the packet bus and distributing the packet-based signal to the packet bus.

13. A system according to claim 12 wherein, the packet bus interface further comprises a multiplexer coupled to the digital signal processor for sending and receiving packets.

14. A system according to claim 9 wherein, the signal processing server comprises a packet bus interface for interfacing with the packet bus and coupled to the digital signal processor for sending and receiving packets to and from the digital signal processor; and wherein the digital signal processor performs transcoding on packet-based signals.

15. A system according to claim 14 wherein, the packet bus interface further comprises a multiplexer.

16. A system for connecting a circuit network with a packet network, the system comprising:

means for receiving a circuit-based signal from the circuit network and performing echo cancellation and packet adaptation on the circuit-based signal forming a packet-based signal; means for transcoding the packet-based signal forming a transcoded packet-based signal; means for transmitting the transcoded packet-based signal to the packet network; and a packet switch fabric coupled to the means for receiving, the means for sending, and the means for transcoding so as to enable transfer of packet-based signals among the means for receiving, the means for transmitting, and the means for transcoding.

17. A system for connecting a packet network with a circuit network, the system comprising:

means for receiving a packet-based signal from the packet network;

means for transcoding the packet-based signal;

means for performing packet adaptation and echo cancellation on the packet-based signal forming a circuit-based signal;

means for sending the circuit-based signal to the circuit network; and a packet switch fabric coupled to the means for receiving, the means for sending, and the means for transcoding so as to enable transfer of packet-based signals among the means for receiving, the means for sending, and the means for transcoding.

18. A method for communicating a packet-based signal as a circuit-based signal, the method comprising:

receiving the packet-based signal into a packet network server;

transferring the packet-based signal from the packet network server to a packet switch fabric;

transferring the packet-based signal from the packet switch fabric to a signal processing server;

transcoding the packet-based signal creating a transcoded packet-based signal;

transferring the transcoded packet-based signal from the signal processing server to the packet switch fabric;

transferring the transcoded packet-based signal from the packet switch fabric to a circuit network server;

adapting the transcoded packet-based signal forming a circuit-based signal;

performing echo cancellation on the circuit-based signal;

sending the circuit-based signal from the circuit network server.

19. A method of communicating between a first circuit network server and a second circuit network server, the method comprising:

receiving a circuit-based signal into the first circuit network server;

performing packet adaptation on the circuit-based signal forming a packet-based signal;

performing signal processing on the packet-based signal;

transferring the packet-based signal to a second circuit network server;

adapting the packet-based signal forming a circuit-based signal;

sending the circuit-based signal from the second circuit network server.

20. The method according to claim 19, wherein the signal processing is gateway signal processing.

21. The method according to claim 20, wherein the gateway signal processing is transcoding.

22. The method according to claim 20, wherein the gateway signal processing is performed on a signal processing server.

23. A system for connecting a circuit network with a packet network, the system comprising:

a packet switch fabric;

a circuit network server having a plurality of ports for sending and receiving circuit-based signals with the circuit network, the circuit network server having a first at least one digital signal processor which performs packet adaptation and a second at least one digital signal processor which subsequent to the packet adaptation performs signal processing and an interface for multiplexing, sending and receiving packet-based signals having packets with the packet switch fabric; and a packet network server having a first port for sending and receiving packet-based signals with the packet switch fabric and a second port for sending and receiving packet-based :signals with the packet network;

wherein the packet switch fabric transfers packet-based signals among the packet network server and the circuit network server.

24. A system according to claim 23 wherein, the signal processing performed on the second at least one digital signal processor is gateway signal processing.

25. A system according to claim 24 wherein, the gateway signal processing on the second at least one digital signal processor of the circuit network server is transcoding.

26. A system according to claim 24 wherein, the gateway signal processing on the second at least one digital signal processor of the circuit network server is echo cancellation.

27. A system according to claim 23 wherein, the packet switch fabric further comprises a switch for switching among the packet network server and the circuit network server.

28. A system according to claim 23 wherein, the packet switch fabric is a packet bus.

29. A system according to claim 23 further comprising a signal processing server having a port for sending and receiving packet-based signals with the packet switch fabric, the signal processing server having a digital signal processor for performing signal processing on the packet-based signals;

wherein the packet switch fabric transfers packet-based signals to the signal processing server.

30. A system according to claim 29 wherein, the signal processing performed on the digital signal processor of the signal processing server is gateway signal processing.

* * * * *